J. J. COCHRAN.
HOSE COUPLING.
APPLICATION FILED MAR. 12, 1910.
1,010,236.
Patented Nov. 28, 1911.
2 SHEETS—SHEET 1.
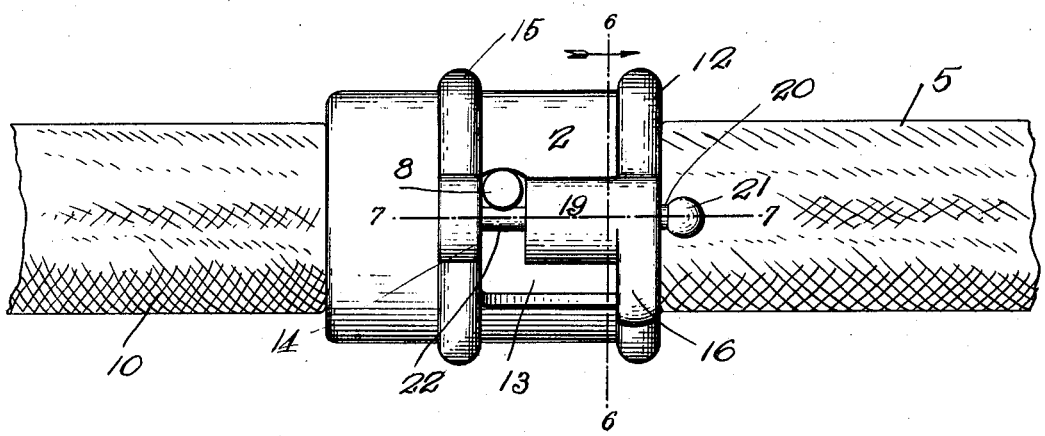
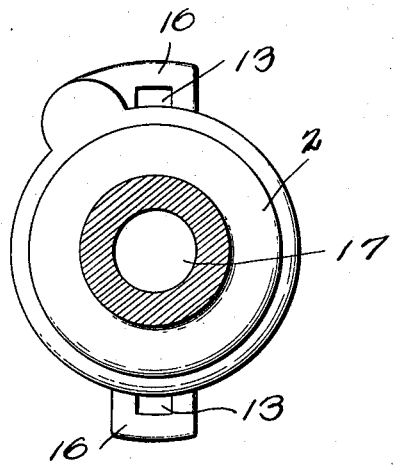
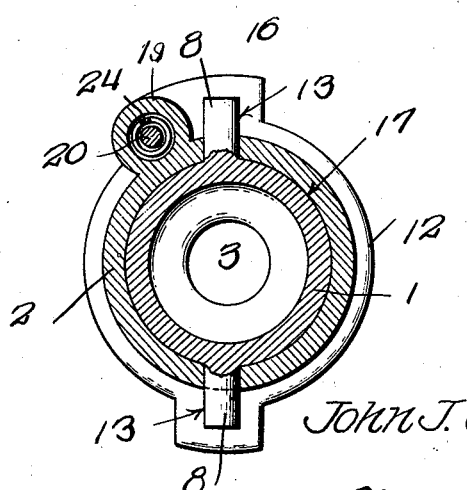
Witnesses
Chas. C. Richardson.
D. W. Gould.
Inventor
John J. Cochran,
By Victor J. Evans
Attorney J. J. COCHRAN.
HOSE COUPLING.
APPLICATION FILED MAR. 12, 1910.
1,010,236.
Patented Nov. 28, 1911.
2 SHEETS—SHEET 2.
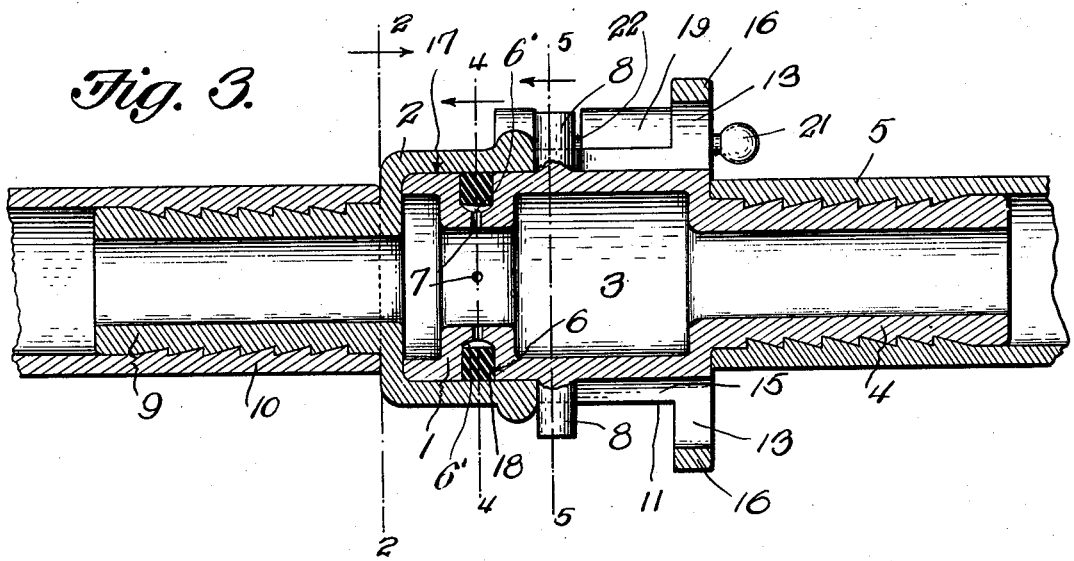
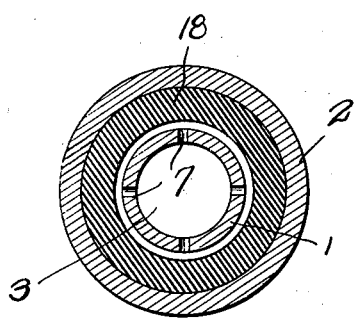
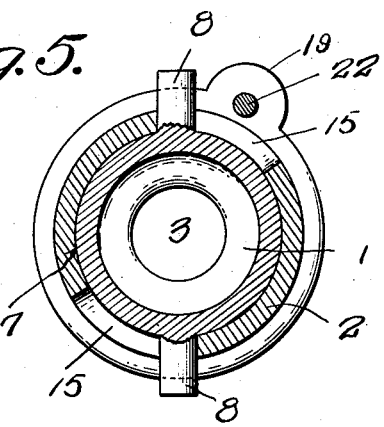
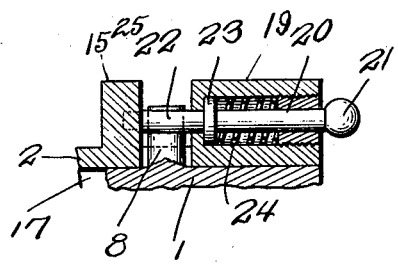
Witnesses
Chas. C. Richardson.
D. W. Gould.
Inventor
John J. Cochran
By Victor J. Evans
Attorney

UNITED STATES PATENT OFFICE.

JOHN J. COCHRAN, OF SAN FRANCISCO, CALIFORNIA.

HOSE-COUPLING.

1,010,236.     Specification of Letters Patent.     Patented Nov. 28, 1911.

Application filed March 12, 1910. Serial No. 548,878.

*To all whom it may concern:*

Be it known that I, JOHN J. COCHRAN, a citizen of the United States, residing at San Francisco, in the county of San Francisco and State of California, have invented new and useful Improvements in Hose-Couplings, of which the following is a specification The invention relates to an improvement in hose couplings being more particularly directed to a coupling in which the parts may be readily connected by hand and in which the pressure of the fluid passing through the coupling serves to inaugurate and maintain a fluid tight juncture and at the same time prevent manual separation of the parts.

The main object of the present invention is the provision of a coupling comprising a male and a female member, the former being provided with a sealing element designed to be acted on by the pressure of the fluid passing through the coupling and to be expanded by said pressure to form an air tight juncture, said members being adapted for interlock in a manner to utilize the pressure of the fluid to prevent any tendency to unlock.

A further object of the invention is the provision of means whereby the members may be secured against separation in the absence of pressure within the hose, as when not in use.

The invention in its preferred details of construction will be described in the following specification, reference being had particularly to the accompanying drawings, in which:—

Figure 1 is a view in plan of the improved coupler showing the parts connected. Fig. 2 is a section on line 2—2 of Fig. 3. Fig. 3 is a longitudinal section through the coupling and ends of the hose sections. Fig. 4 is a section on line 4—4 of Fig. 3. Fig. 5 is a section on line 5—5 of Fig. 3. Fig. 6 is a section on the line 6—6 of Fig. 1. Fig. 7 is a section, on the line 7—7 of Fig. 1, disclosing in detail the improved locking means.

Referring particularly to the accompanying drawings in which are shown the preferred details of construction, my improved coupling is made up primarily of two parts, hereinafter termed a male member 1 and a female member 2.

The male member comprises a cylindrical section having an enlarged bore 3 and exteriorly reduced at one end, as at 4, to provide for the connection of the hose end 5 thereto, the exterior surface of the part 4 being corrugated or roughened in any usual manner to insure a fluid tight connection at this point with the use of the usual wrapping or clamping means (not shown). In advance of the reduced portion 4 the exterior surface of the male member is formed near its forward end with an annular channel 6 forming what will be hereinafter termed a gasket seat. The wall of the male member is formed, in alinement with the gasket seat, with a plurality of openings 7 designed to establish communication between said seat and the exterior of the male member. The male member, at diametrically opposite points, is formed with locking pins 8 which may be secured in any desired manner in said member and extend beyond the outer surface thereof a distance exceeding the normal thickness of the overlying portion of the female member, as will presently appear.

The female member 2 comprises a cylindrical body having a reduced rear end 9 designed to be engaged by the end of the hose section 10, as in the case of the male member. In advance of the reduced portion the female member is provided with a diametrically increased coupling section 11, having an interior diameter corresponding to the exterior diameter of the enlarged portion of the male member. The female member is formed at its forward edge with an annular strengthening bead 12, and is also formed with locking grooves 13 to receive the pins 8 of the male member. These grooves are formed at their relatively inner or rear ends with laterally projecting lengths 14. The entrance ends of the slots 13 are inclosed by the under surface of the bead 12, the pins 8 of the male member being of a projected length slightly less than the thickness of the walls of the grooves to permit easy passage thereunder, the bead being preferably strengthened at this point by the projections 16.

When the respective members are connected with the pins resting in the lengths 14 of the locking slots, the enlarged portion of the male member is completely housed within the coupling section of the female member.

In use, with the parts connected, the water under pressure passing through the coupling will enter the holes 7 and expand a gasket 18 disposed in the gasket seat 6. By reason of the concaved bottom wall 6' of this seat the pressure of the water is evenly distributed and the gasket forced into contact with the coupling section 11. The gasket 18 is preferably of rubber comprising an endless band and is of course to be sufficiently elastic to permit the action described.

As the means for preventing accidental separation of the pins from the locking slots when the interior pressure on the hose is relieved, I provide means for securing the pins in the slot. Such means as these, cited more particularly in Figs. 1 and 7, comprise a cylindrical casing 19 secured upon the female member 2 of the coupling with the open end immediately adjacent that wall of one of the slots 13 remote from the free end of said member. Within the casing is mounted a stem 20 projecting beyond the outer wall of the casing in the form of a handle or knob 21 and beyond the inner end of the casing in the form of a securing bar 22. A disk 23 is secured upon the bar and designed when the latter is in operative position to bear against the inner end of the casing, a spring 24 encircling the bar within the casing and bearing at its respective ends against a plug closing the outer end of the casing and the disk 23. In alinement with the casing the adjacent bead projection 15 is formed with an opening 25 in which the free end of the securing bar is positioned when in operative position.

From Fig. 1, it will be obvious that with the securing means the disconnection of the male and female members of the coupling is impossible except after manual manipulation of said securing means.

The improved coupling is designed particularly for connecting sections of fire hose or other hose when it is desirable to provide a positive sealing connection while at the same time permitting a speedy and convenient coupling without the use of tools or other accessories. The present coupling insures a sealing connection and may be readily and speedily joined in assembling the parts. As long as the pressure is maintained in the parts, the coupling members cannot separate and a sealing effect is maintained in direct proportion to the pressure.

The parts of the improved coupling are to be constructed of any desired and appropriate material and to be in any size and shape best adapted for the particular use to which the coupling is to be put.

Having thus described the invention, what I claim as new is:—

In a hose coupling, the combination of a male member and a female member, spaced chambers being interiorly formed in the male member, said female member being exteriorly formed with spaced annular beads, means for connecting said members including locking slots formed in the female and pins projecting from the male member, said slots opening through one of the beads and terminating adjacent the other, a casing integrally formed with the female member, a spring-actuated bolt carried in said casing, said female member being formed with a lug provided with an aperture in alinement with said bolt.

In testimony whereof I affix my signature in presence of two witnesses.

JOHN J. COCHRAN.

Witnesses:
  ANNE F. HASTY,
  MILTON FOX.